US012107290B2

(12) United States Patent
Sumi et al.

(10) Patent No.: US 12,107,290 B2
(45) Date of Patent: Oct. 1, 2024

(54) ELECTRONIC APPARATUS

(71) Applicant: Makita Corporation, Anjo (JP)

(72) Inventors: Takuya Sumi, Anjo (JP); Sho Tsuda, Anjo (JP)

(73) Assignee: MAKITA CORPORATION, Anjo (JP)

( * ) Notice: Subject to any disclaimer, the term of this patent is extended or adjusted under 35 U.S.C. 154(b) by 515 days.

(21) Appl. No.: 17/549,166

(22) Filed: Dec. 13, 2021

(65) Prior Publication Data

US 2022/0190429 A1  Jun. 16, 2022

(30) Foreign Application Priority Data

Dec. 16, 2020 (JP) ................. 2020-208677

(51) Int. Cl.
*H01M 50/262* (2021.01)
*H01M 50/209* (2021.01)
*H01M 50/271* (2021.01)

(52) U.S. Cl.
CPC ....... *H01M 50/262* (2021.01); *H01M 50/209* (2021.01); *H01M 50/271* (2021.01)

(58) Field of Classification Search
CPC . H01M 50/247; H01M 50/271; H01M 50/262
See application file for complete search history.

(56) References Cited

U.S. PATENT DOCUMENTS

| 5,630,193 A | 5/1997 | Miyake et al. | |
| 2004/0135542 A1* | 7/2004 | Ito | H02J 7/0045 320/107 |
| 2020/0303933 A1* | 9/2020 | Murakami | H02J 7/0044 |

FOREIGN PATENT DOCUMENTS

JP  3497260 B2  2/2004

* cited by examiner

*Primary Examiner* — Maria Laios
*Assistant Examiner* — Jordan E Berresford
(74) *Attorney, Agent, or Firm* — Sughrue Mion, PLLC

(57) ABSTRACT

An electrical apparatus may be provided with: a housing; a first electrical apparatus-side terminal; a first terminal cover configured to move between a covering position and an exposing position; and a first locking member configured to engage with the first terminal cover positioned at the covering position, and configured to move between a lock position at which the first locking member restricts movement of the first terminal cover from the covering position to the exposing position and an unlock position. The first locking member may be configured to move from the lock position to the unlock position while a first target apparatus is slid in the sliding direction to be attached to the housing. When the first locking member is positioned at the lock position, a user may be unable to directly shift the first locking member from the lock position to the unlock position.

7 Claims, 14 Drawing Sheets

ELECTRONIC APPARATUS

CROSS-REFERENCE TO RELATED APPLICATION

This application claims priority to Japanese Patent Application No. 2020-208677 filed on Dec. 16, 2020, the contents of which are hereby incorporated by reference into the present application.

TECHNICAL FIELD

The art disclosed herein relates to an electronic apparatus.

BACKGROUND ART

Japanese Patent No. 3497260 describes an electrical apparatus including: a housing including a receptacle to which a target apparatus is configured to be detachably attached by sliding the target apparatus in a sliding direction; an electrical apparatus-side terminal configured to be electrically connected with a target apparatus-side terminal of the target apparatus attached to the receptacle; a terminal cover configured to move between a covering position at which the terminal cover covers the electrical apparatus-side terminal and an exposing position at which the terminal cover leaves the electrical apparatus-side terminal exposed; and a locking member configured to engage with the terminal cover positioned at the covering position, and configured to move between a lock position at which the locking member restricts movement of the terminal cover from the covering position to the exposing position and an unlock position at which the locking member does not restrict the movement of the terminal cover from the covering position to the exposing position.

SUMMARY

In the electrical apparatus of Japanese Patent. No. 3497260, the locking member moves from the lock position to the unlock position when the target apparatus is placed on the housing of the electrical apparatus. After that, the target apparatus is moved in the sliding direction to be attached to the electrical apparatus. In this electrical apparatus, in a state where the locking member is positioned at the lock position, a user is able to directly shift the locking member from the lock position to the unlock position. Due to this, there may be a situation where the locking member may possibly be moved from the lock position to the unlock position by the user, resulting in the terminal cover being moved from the covering position to the exposing position. In other words, there is a possibility that the electrical apparatus-side terminal may be exposed in a state where the target apparats is not attached to the electrical apparatus. It is undesirable that the electrical apparatus-side terminal is exposed in the situation where the target apparatus is not attached to the electrical apparatus.

The present disclosure provides an art which allows for improving safety for a user who uses an electrical apparatus.

An electrical apparatus disclosed in the disclosure may comprise: a housing comprising a first receptacle to which a first target apparatus is configured to be detachably attached by sliding the first target apparatus in a sliding direction; a first electrical-apparatus-side terminal configured to be electrically connected with a first target apparatus side terminal of the first target apparatus attached to the first receptacle; a first terminal cover configured to move between a covering position at which the first terminal cover covers the first electrical-apparatus-side terminal and an exposing position at which the first terminal cover leaves the first electrical-apparatus-side terminal exposed; and a first locking member configured to engage with the first terminal cover positioned at the covering position, and configured to move between a lock position at which the first locking member restricts movement of the first terminal cover from the covering position to the exposing position and an unlock position at which the first terminal cover does not restrict the movement of the first terminal cover from the covering position to the exposing position. The first locking member may be configured to move from the lock position to the unlock position while the first target apparatus is slid in the sliding direction to be attached to the housing. When the first locking member is positioned at the lock position, a user may be unable to directly shift the first locking member from the lock position to the unlock position.

According to the above configuration, the locking member can be prevented from being shifted from the lock position to the unlock position by the user in the state in which the first target apparatus is not attached to the electrical apparatus. Due to this, there will be less possibility that the terminal cover is shifted from the covering position to the exposing position to expose the first electrical apparatus-side terminal in the state in which the first electrical apparatus is not attached to the electrical apparatus. Consequently, safety for the user who uses the electrical apparatus can be improved.

DETAILED DESCRIPTION

Figure 1:
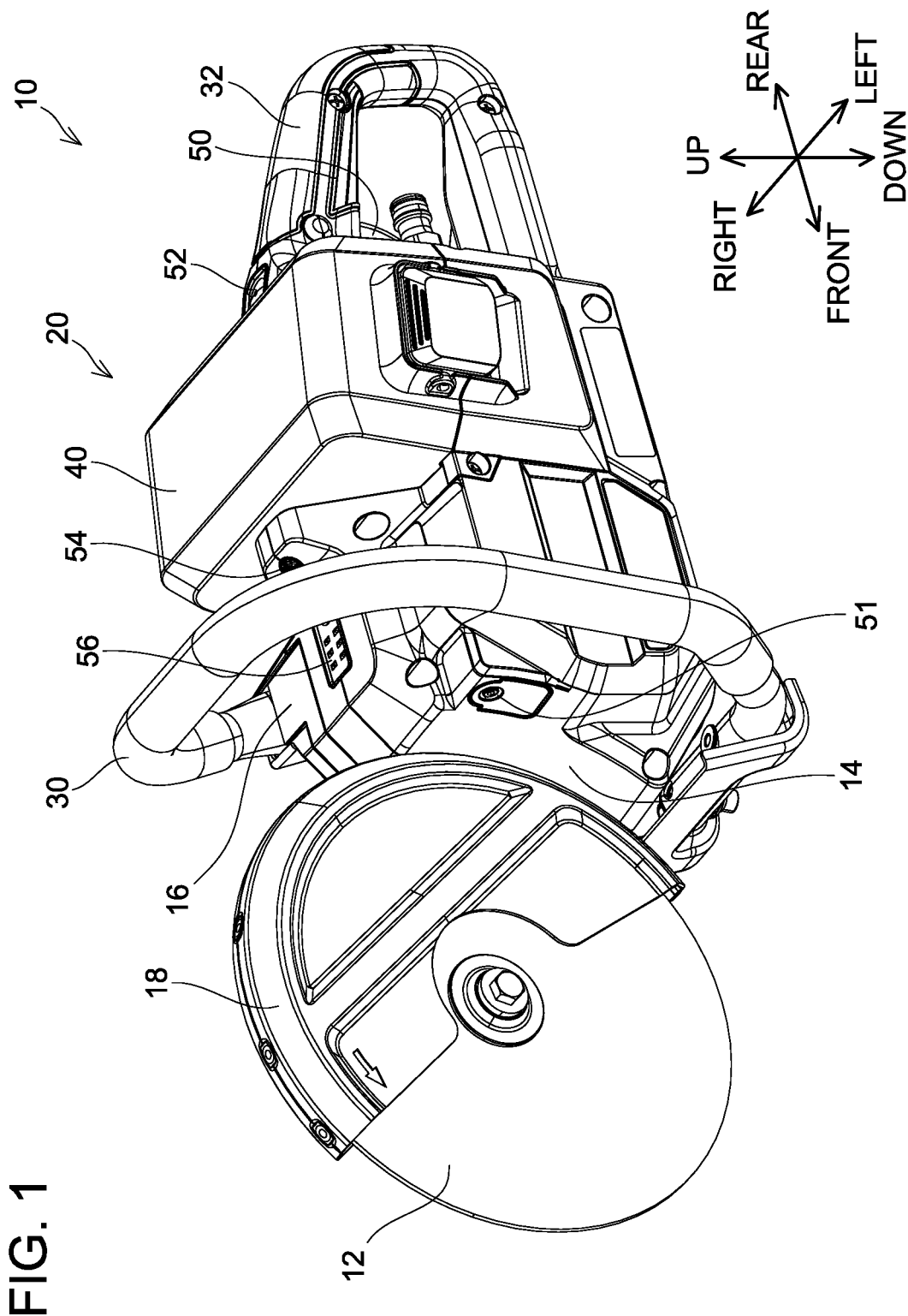
FIG. 1 illustrates a perspective view of a power cutter 10 according to an embodiment.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved electronic apparatuses, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, an electrical apparatus may comprise: a housing comprising a first receptacle to which a first target apparatus is configured to be detachably attached by sliding the first target apparatus in a sliding direction; a first electrical-apparatus-side terminal configured to be electrically connected with a first target apparatus side terminal of the first target apparatus attached to the first receptacle; a first terminal cover configured to move between a covering position at which the first terminal cover covers the first electrical-apparatus-side terminal and an exposing position at which the first terminal cover leaves the first electrical-apparatus-side terminal exposed; and a first locking member configured to engage with the first terminal cover positioned at the covering position, and configured to move between a lock position at which the first locking member restricts movement of the first terminal cover from the covering position to the exposing position and an unlock position at which the first locking member does not restrict the movement of the first terminal cover from the covering position to the exposing position. The first locking member may be configured to move from the lock position to the unlock position while the first target apparatus is slid in the sliding direction to be attached to the housing. When the first locking member is positioned at the lock position, a user may be unable to directly shift the first locking member from the lock position to the unlock position.

In one or more embodiments, the first locking member may comprise two first locking members. Under a state in which at least one of the two first locking members engages with the first terminal cover, the movement of the first terminal cover from the covering position to the exposing position may be restricted.

According to the above configuration, even in a case where one of the first locking members is moved from the lock position to the unlock position, the movement of the first terminal cover from the covering position to the exposing position is restricted as long as the other of the first locking members is positioned at the lock position. Due to this, even if a user's finger touches the one of the first locking members and that locking member is accidentally shifted from the lock position to the unlock position, the terminal cover can be prevented from moving from the covering position to the exposing position. Thus, safety for the user who uses the electrical apparatus can further be improved.

In one or more embodiments, the housing may comprise a pair of recessed grooves extending along the sliding direction, Each of the two first locking members may be disposed in a corresponding one of the recessed grooves. A size of each of the recessed grooves in a width direction may be smaller than a size of a user's finger.

According to the above configuration, there will be less possibility that the two first locking members are operated simultaneously (all at once). Accordingly, safety for the user who uses the electrical apparatus can further be improved.

In one or more embodiments, the housing may comprise a recessed groove extending along the sliding direction. The first locking member may be disposed in the recessed groove. The first locking member may be configured to be moved from the lock position to the unlock position by a slide rail of the first target apparatus being inserted into the recessed groove. A size of the recessed groove in a width direction may be smaller than a size of a user's finger.

If the first locking member is configured not to be moved from the lock position to the unlock position by the slide rail of the first target apparatus, a member different from the first locking member needs to be provided. Specifically, there would be a need for providing a member configured to move the first locking member from the lock position to the unlock position in response to being touched by the slide rail of the first target apparatus. According to the above configuration, another member than the locking member does not have to be provided. Thus, a number of components in the electrical apparatus can be therefore reduced.

In one or more embodiments, the electrical apparatus may further comprise a bias member configured to bias the first terminal cover from the exposing position to the covering position. The first terminal cover may further comprise a mover part configured to contact the first locking member to move the first locking member from the unlock position to the lock position when the first terminal cover is biased from the exposing position to the covering position by the bias member.

According to the above configuration, in response to the first target apparatus being removed from the electrical apparatus, the terminal cover is biased from the exposing position to the covering position by the bias member. Then, the terminal cover makes the first locking member move from the unlock position to the lock position. Due to this, the user does not have to move the first locking member from the unlock position to the lock position. Thus, convenience for the user can be improved.

In one or more embodiments, the first target apparatus may be a first battery pack. The housing may further comprise a second receptacle to which a second battery pack is configured to be detachably attached by sliding the second battery pack in the sliding direction. The electrical apparatus may be a working machine configured to operate with electric power supplied from the first battery pack and the second battery pack. The working machine may further comprise: a second electrical-apparatus-side terminal configured to be electrically connected with a second-target-apparatus-side terminal of the second battery pack attached to the second receptacle; a second terminal cover configured to move between a covering position at which the second terminal cover covers the second electrical-apparatus-side terminal and an exposing position at which the second terminal cover leaves second electrical-apparatus-side terminal exposed; and a second locking member configured to engage with the second terminal cover positioned at the covering position, and configured to move between a lock position at which the second locking member restricts movement of the second terminal cover from the covering position to the exposing position and an unlock position at which the second locking member does not restrict the movement of the second terminal cover from the covering position to the exposing position. When the second battery pack is slid in the sliding direction to be attached to the housing, the second locking member may be configured to move from the lock position to the unlock position. When the second locking member is positioned at the lock position, an object is unable to directly shift the second locking member from the lock position to the unlock position.

In the above-identified electrical apparatus, the first battery pack is attached to the first receptacle of the electrical apparatus, and thus in a state in which the second battery pack is not attached to the electrical apparatus, it is likely that electric power supply for the electrical apparatus is served by the first battery pack. It is not desirable that the second electrical apparatus-side terminal is exposed in such a state. According to the above configuration, the second electrical apparatus-side terminal can be suppressed from being exposed in the state in which the first battery pack is attached to the first receptacle but the second battery pack is not attached to the electrical apparatus. Safety for the user who uses the electrical apparatus can be accordingly improved.

Embodiment

Figure 2:
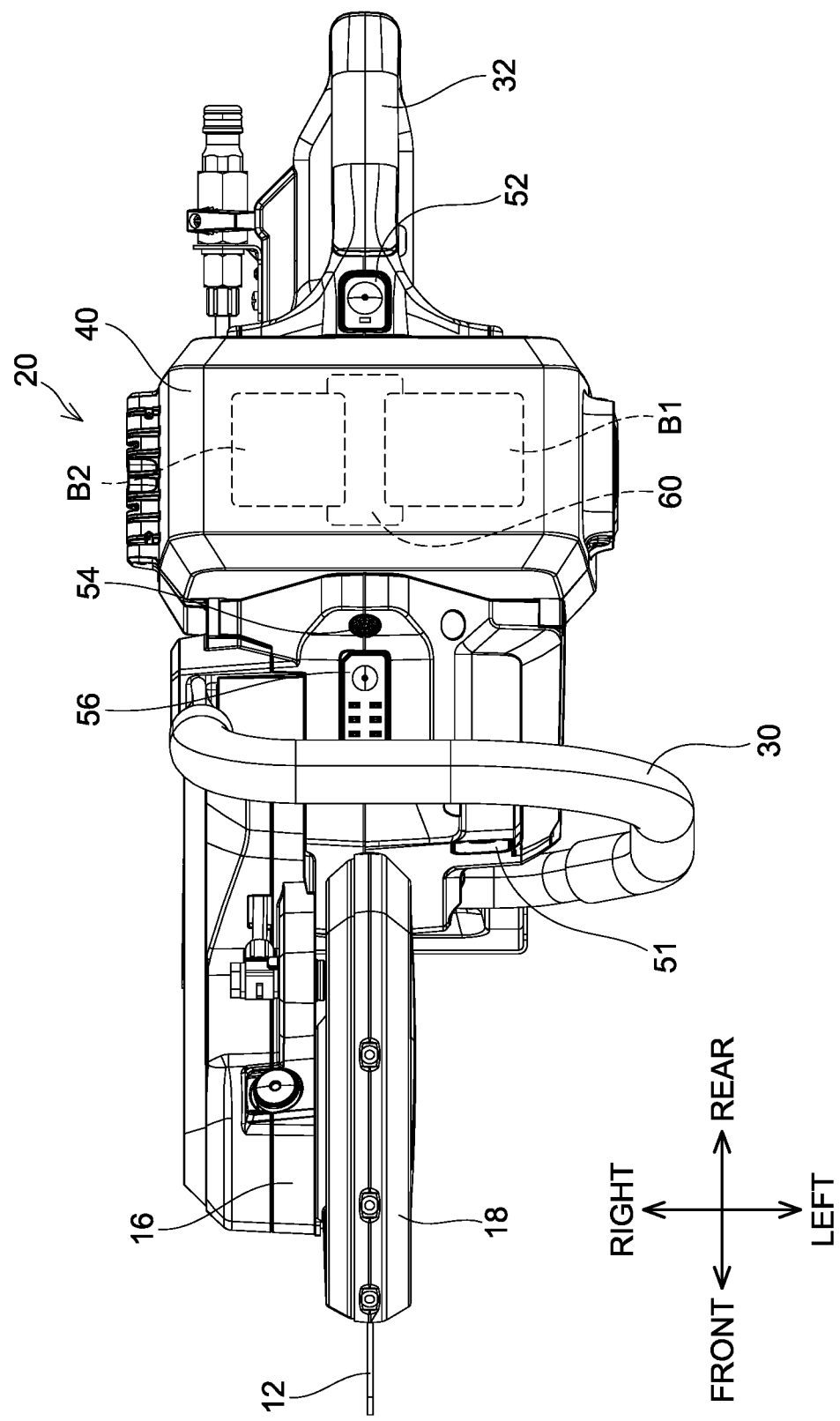
FIG. 2 illustrates a top view of the power cutter 10 of the embodiment as seen from above.
Figure 3:
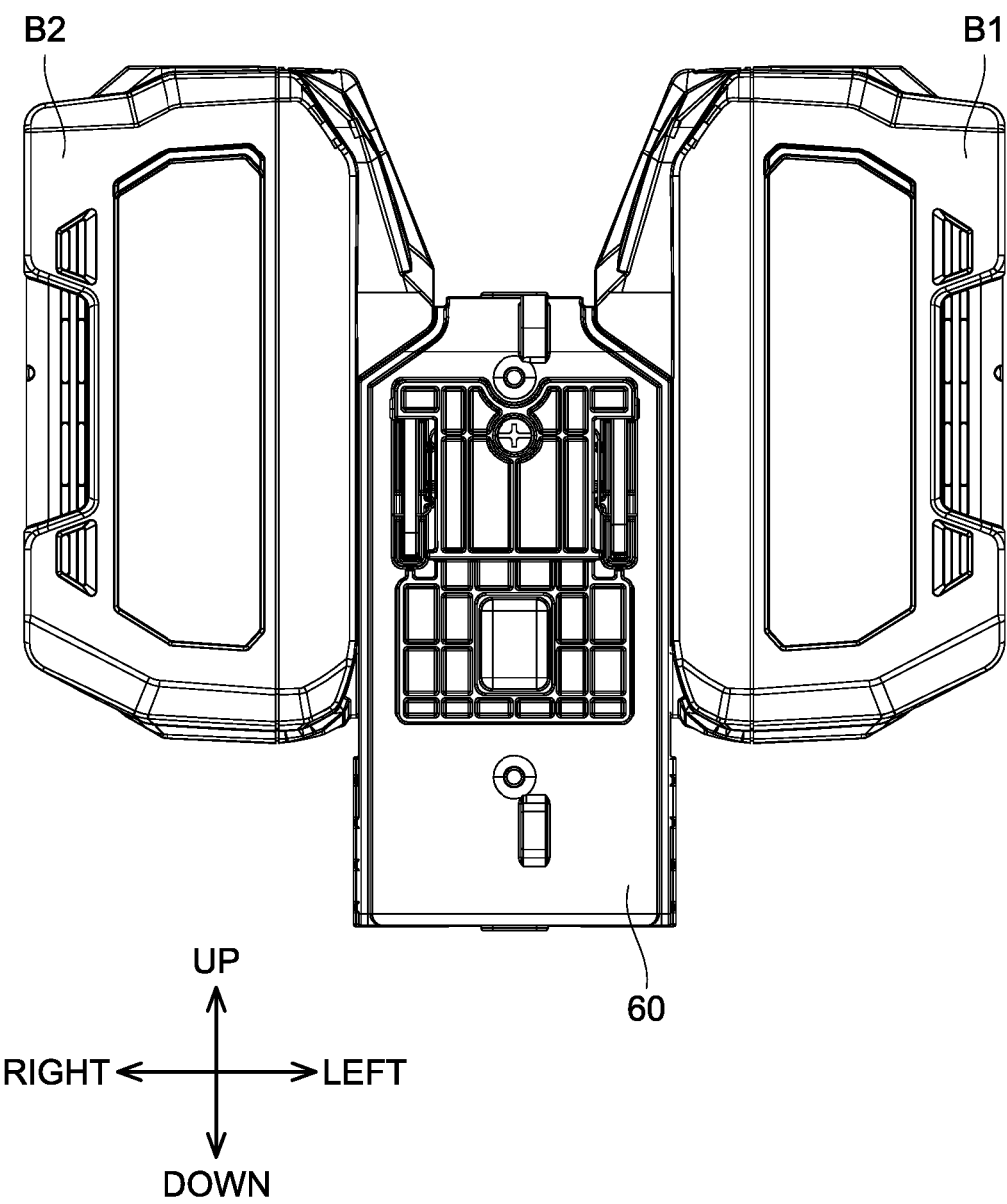
FIG. 3 illustrates a front view of a terminal housing 60 housed in a battery casing 20 of the embodiment, as seen from front.

With reference to FIGS. 1 to 9, a power cutter 10 will be described. The power cutter 10 is a hand-held power tool and used for cutting a target material such as stone and steel. As shown in FIGS. 1 and 2, the power cutter 10 comprises a disk blade 12, an outer housing 14, a metal blade arm 16, a blade cover 18, and a battery easing 20. The blade arm. 16 extends frontward from a right portion of the outer housing 14. The disk blade 12 is a blade having a disk shape, and has a plurality of cutting edges or has a grinding wheel at its outer circumferential edge. The blade cover 18 is assembled with the blade arm 16, and covers a part of the disk blade 12, The blade cover 18 prevents dust generated by the disk blade 12 from flying over to a user.

The power cutter 10 further comprises a front grip 30 and a rear grip 32. The front grip 30 is disposed on a front portion of the outer housing 14. The rear grip 32 is disposed on a rear portion of the outer housing 14, and extends rearward from the outer housing 14.

The battery casing 20 is disposed between the front grip 30 and the rear grip 32. The battery casing 20 has a battery cover 40 configured to be open and closed. As shown in FIG. 2, a terminal housing. 60, and two battery packs B1, B2 are housed inside the battery casing 20.

As shown in FIG. 1, the rear grip 32 is provided with a main switch 50. A motor (not shown) housed in the outer housing 14 drives the disk blade 12 when the user operates the main switch 50. When the user stops operating the main switch 50, the motor stops driving the disk blade 12. A light switch 52 for turning on and off a light 51 is disposed on an upper surface of the rear grip 32.

The power cutter 10 further comprises an overload indicator 54 and a battery indicator 56. The overload indicator 54 is an indicator for informing the user of presence of overload applied on the disk blade 12. The battery indicator 56 is an indicator for informing the user of a charged amount of each of the two battery packs 131, 132.

Figure 4:
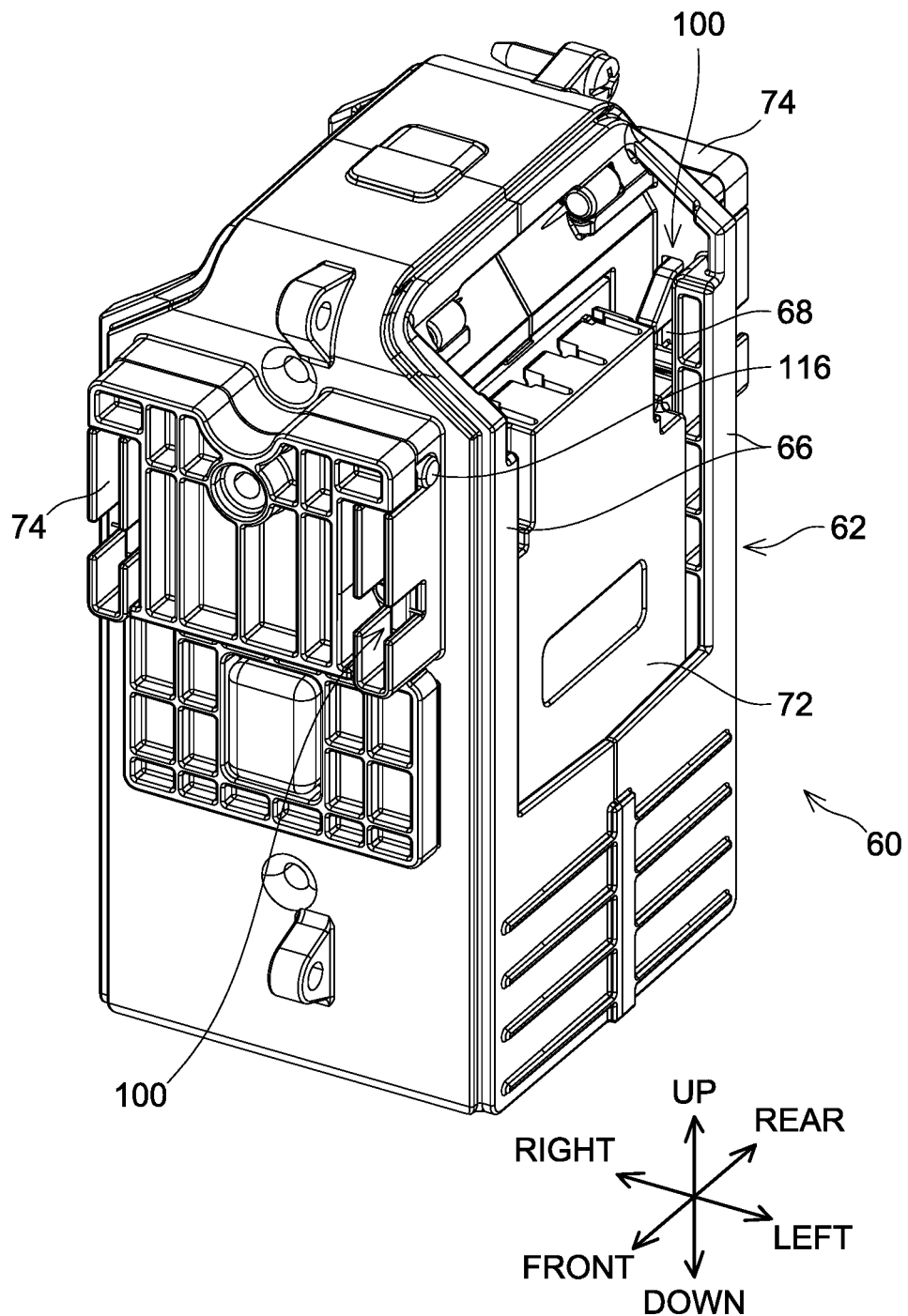
FIG. 4 illustrates a perspective view of a terminal cover 72 being at a covering position in the terminal housing 60 of the embodiment.
Figure 5:
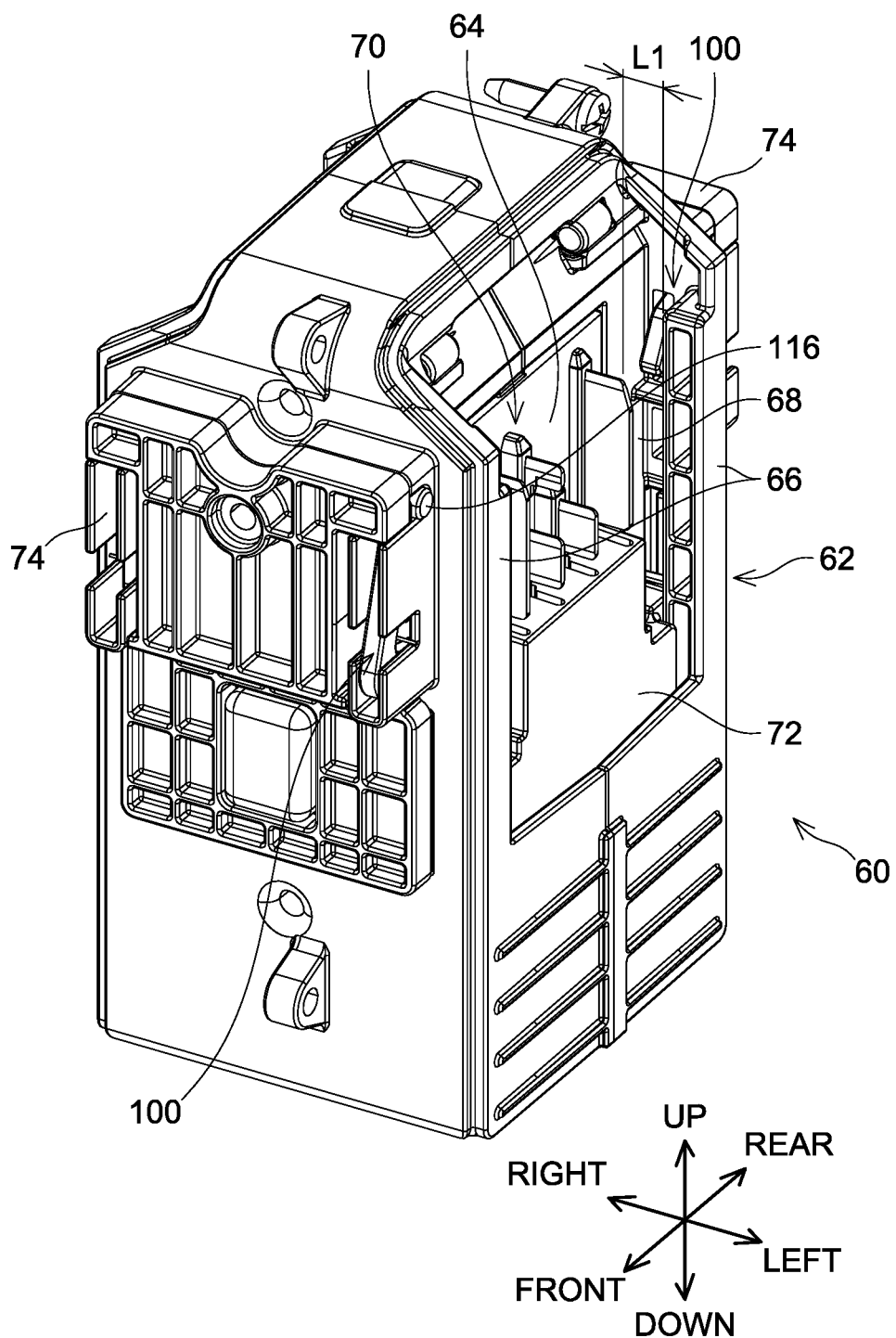
FIG. 5 illustrates a perspective view of the terminal cover 72 being at an exposing position in the terminal housing 60 of the embodiment.
Figure 13:
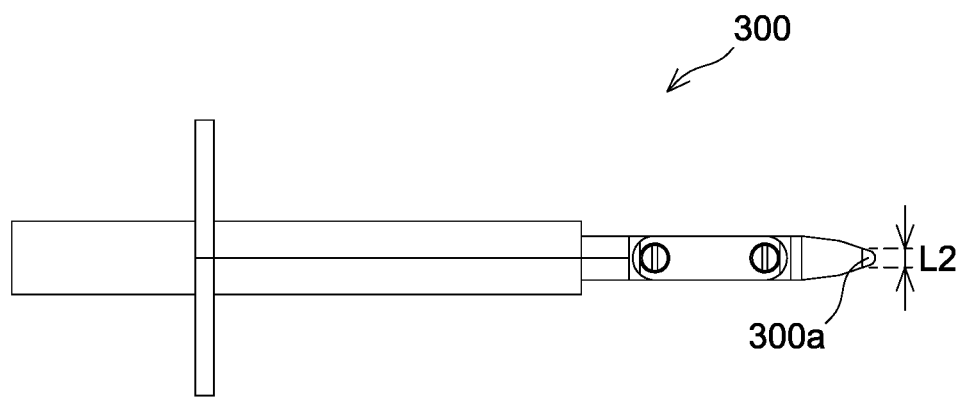
FIG. 13 illustrates a side view of an object 300.

As shown in FIGS. 4 and 5, a battery interface 62 is disposed on a left surface of the terminal housing 60. Also, another battery interface having a same structure as that of the battery interface 62 is disposed on a right surface of the terminal housing 60. As shown in FIG. 5, the battery interface 62 comprises an opening 64, slide sections 66, an apparatus-side terminal 70, and the terminal cover 72. The opening 64 is an opening for exposing the apparatus-side terminal 70 and defined between the slide sections 66 that are on bath ends in a front-rear direction. Slide grooves 68 extending in an up-down direction are defined in the slide sections 66, respectively. A width L1 of each slide groove 68 in a groove direction (left-right direction in the present embodiment) is designed as having a size which does not allow an object 300 (see FIG. 13), which is a model of a user's finger, to pass therethrough. For example, the width L1 of each slide groove 68 is 7.55 mm, and a size L2 of a tip 300a of the object 300 (see FIG. 13) is 7.9 mm. A lock cover 74 is disposed on a front side of the terminal housing 60. Another lock cover 74 is disposed on a rear side of the terminal housing 60.

Figure 6:
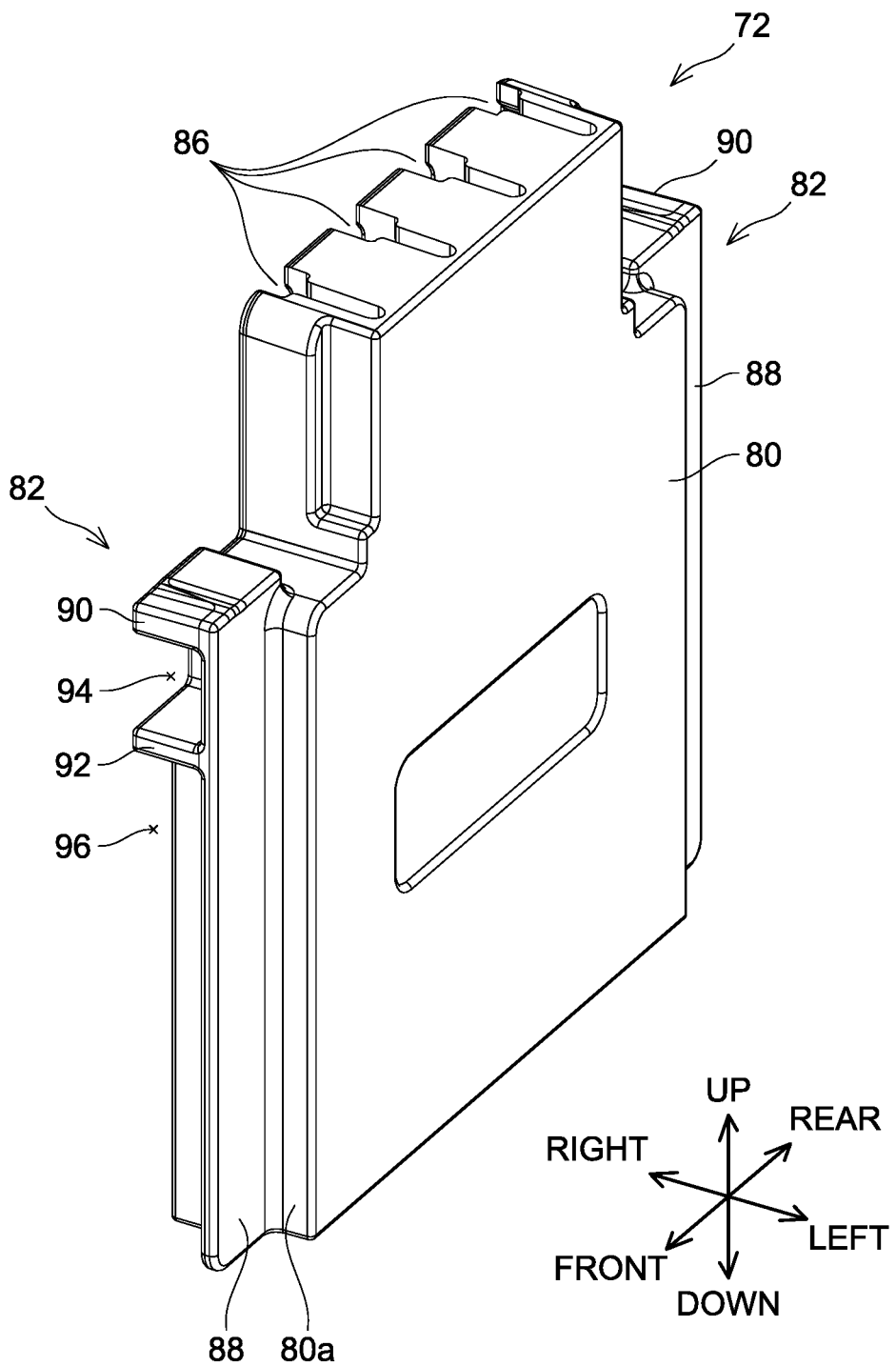
FIG. 6 illustrates a perspective view of the terminal cover 72 of the embodiment as seen from an upper left side.
Figure 7:
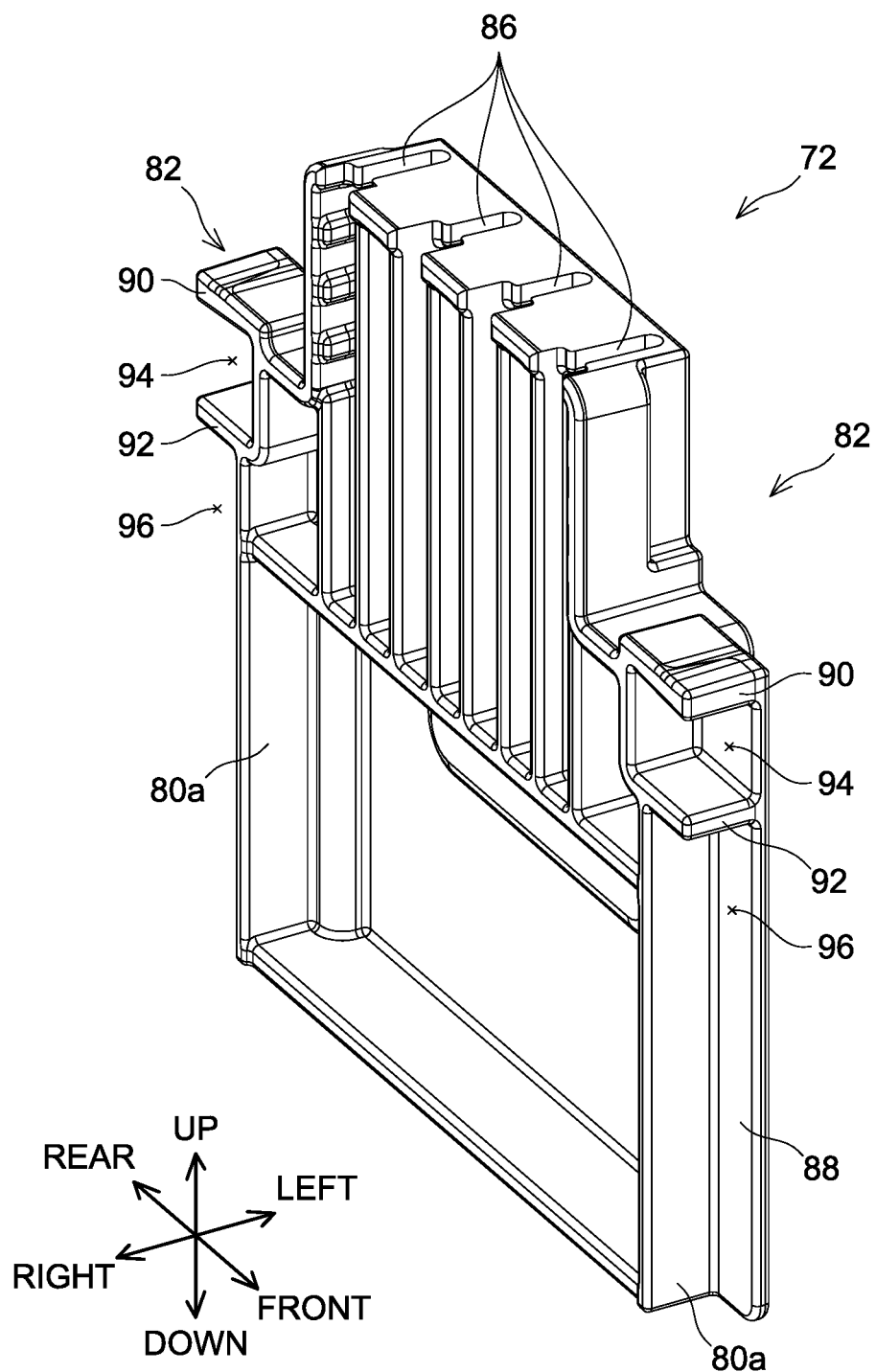
FIG. 7 illustrates a perspective view of the terminal cover 72 of the embodiment as seen from an upper right side.
Figure 8:
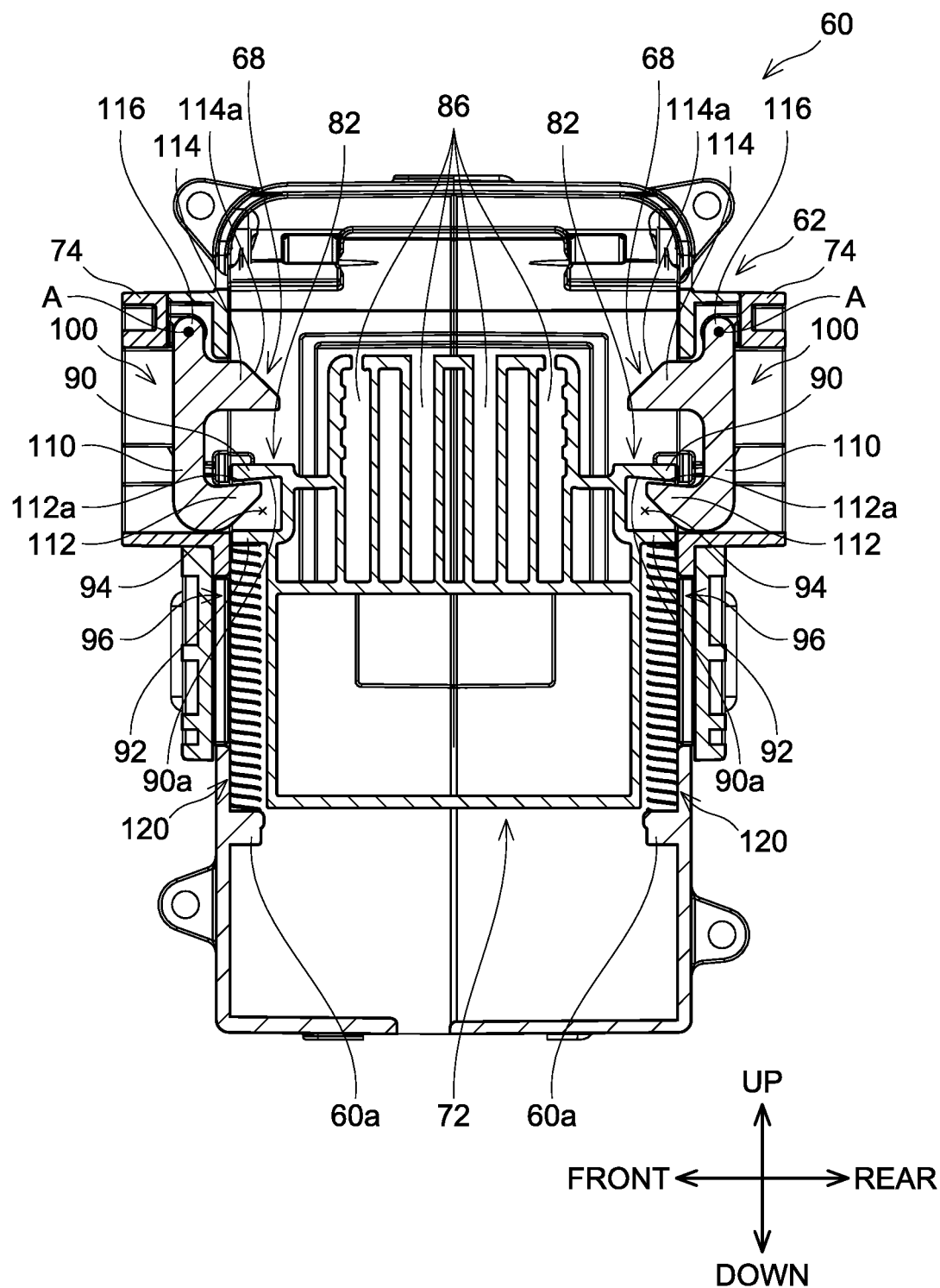
FIG. 8 illustrates a cross-sectional view of the terminal cover 72 being at the covering position in the terminal housing 60 of the embodiment.

The terminal cover 72 is configured slidable relative to the terminal housing 60 in the up-down direction. As shown in FIGS. 6 and 7, the terminal cover 72 comprises a body 80 and rail sections 82. The body 80 and the rail sections 82 are integrated. The body 80 is provided with terminal grooves 86 extending downward from an upper end of the body 80. The terminal grooves 86 are for allowing the apparatus-side terminal 70 (see FIG. 5) to pass therethrough. A shape of the rail section 82 on the front side is symmetrical to the rail section 82 on the rear side with a plane including the left-right direction and the up-down direction interposed therebetween. Hereafter, the front-side rail section 82 will be described while description of the rear-side rail section 82 will be omitted. The front-side rail section 82 comprises a first extension 88, a second extension 90, and a third extension 92 all of which extend frontward from a front wall 80a of the body 80. The second extension 90 extends rightward from an upper end of the first extension 88. As shown in FIG. 8, a lower surface of the second extension 90 includes an inclined portion 90a being inclined upward from the front side to the rear side. As shown in FIGS. 6 and 7, the third extension 92 extends rightward from the first extension 88 at a position lower than that of the second extension 90. A first receptacle 94 is defined between the second extension 90 and the third extension 92, and a second receptacle 96 is defined below the third extension 92. Hereafter, a position at which the terminal cover 72 covers the apparatus-side terminal 70 (see FIG. 4) and a position at which the terminal cover 72 does not cover the apparatus-side terminal 70 (see FIG. 5) will be termed "covering position" and "exposing position", respectively.

Figure 9:
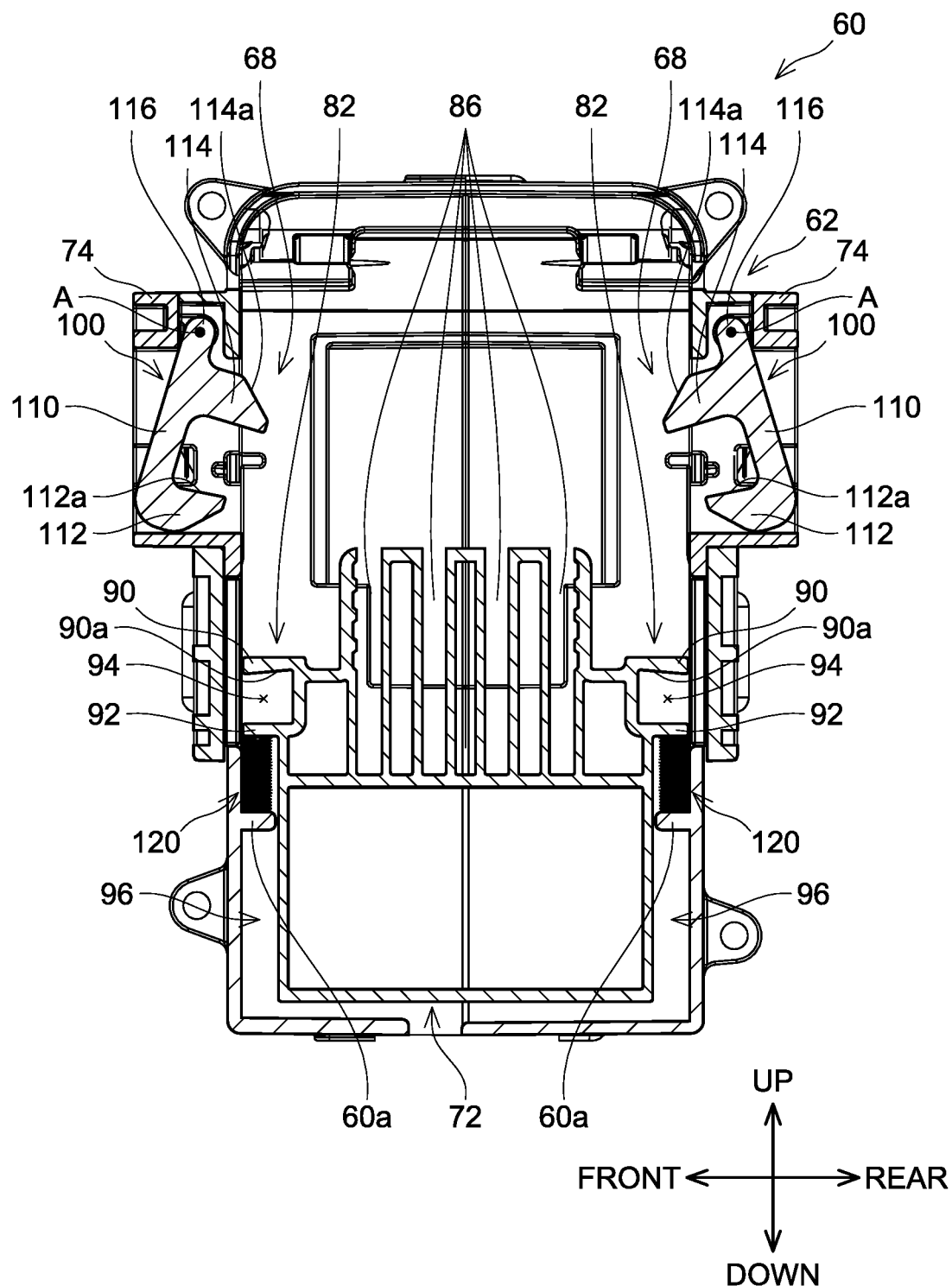
FIG. 9 illustrates a cross-sectional view of the terminal cover 72 being at the exposing position in the terminal housing 60 of the embodiment.

As shown in FIGS. 8 and 9, the battery interface 62 further comprises two locking members 100. Each of FIGS.

8 and 9 is a cross sectional view of the battery interface 62 on the left surface of the terminal housing 60, as seen from the left side. FIG. 8 is a cross-sectional view of the terminal housing 60 when the terminal cover 72 is positioned at the covering position (see FIG. 4) and FIG. 9 is a cross-sectional view of the terminal housing 60 when the terminal cover 72 is positioned at the exposing position (see FIG. 5). In FIGS. 8 and 9, for easier understanding, the apparatus-side terminal 70 is omitted. A shape of the locking member 100 on the front side 115 is symmetrical to the locking member 100 on the rear side with the plane including the left-right direction and the up-down direction interposed therebetween. Hereafter, the front-side locking member 100 in the state of FIG. 8 will be described and description of the rear-side locking member 100 will be omitted. The locking member 100 is disposed between the terminal housing 60 and the lock cover 74. The locking member 100 comprises a base portion 110, an engaging portion 112, a hook portion 114, and a shaft portion 116. The base portion 110 extends along the up-down direction. The engaging portion 112 and the hook portion 114 extend rearward from the base portion 110. The engaging portion 112 is disposed at a lower portion of the base portion 110. The hook portion 114 is disposed higher than the engaging portion 112. An inclined portion 112a disposed on an upper surface of the engaging portion 112 is substantially parallel the inclined portion 90a of the second extension 90 of the terminal cover 72. An upper surface of the hook portion 114 has an inclined portion 114a inclined downward from the front side toward the rear side. As shown in FIG. 8, in a state in which the terminal cover 72 is positioned at the covering position, the engaging portion 112 is received within the first receptacle 94 of the terminal cover 72. The shaft portion 116 extends leftward from above the base portion 110. As shown in FIGS. 4 and 5, the shaft portion 116 is sandwiched between the terminal housing 60 and the lock cover 74. As shown in FIGS. 8 and 9, the locking member 100 pivots around a pivot axis A of the shaft portion 116 which extends in the left-right direction, as its pivoting center.

As shown in FIG. 8, an inner projection 60a is disposed on a front tower side of the terminal housing 60. A bias member 120 is disposed between the inner projection 60a and the third extension 92 of the terminal cover 72. The terminal cover 72 is biased to the covering position (see FIGS. 4 and 8) by the bias member 120 at normal times.

In the present embodiment, in a state in which the terminal cover 72 is positioned at the covering position and also the engaging portion 112 of the locking member 100 is received within the first receptacle 94 of the terminal cover 72, the terminal cover 72 is configured incapable of being moved from the covering position to the exposing position. For example, when the user attempts to move the terminal cover 72 downward in the state of FIG. 8, at first, the inclined portion 90a of the second extension 90 of the terminal cover 72 contacts the inclined portion 112a of the engaging portion 112 of the locking member 100, and force acts in a direction making the locking member 100 pivot rearward around the pivot axis A. Here, since the inclined portion 112a of the locking member 100 is in contact with the inclined portion 90a of the terminal cover 72, the locking member 100 is restricted from pivoting rearward with the pivot axis A as its pivoting center. The downward movement of the terminal cover 72 is accordingly restricted. That is, since the engaging portion 112 of the locking member 100 is in engagement with the terminal cover 72, the downward movement of the terminal cover 72 is restricted. Hereafter, a position of the locking member 100 at which the engaging portion 112 of the locking member 100 is received within the first receptacle 94 of the terminal cover 72 (see FIG. 8) will be termed "lock position" while a position of the locking member 100 at which the engaging portion 112 is located outside the first receptacle 94 (see FIG. 9) will be termed "unlock position". The locking member 100 is connected with a lever spring (not shown) which biases the locking member 100 from the unlock position to the lock position.

Figure 10:
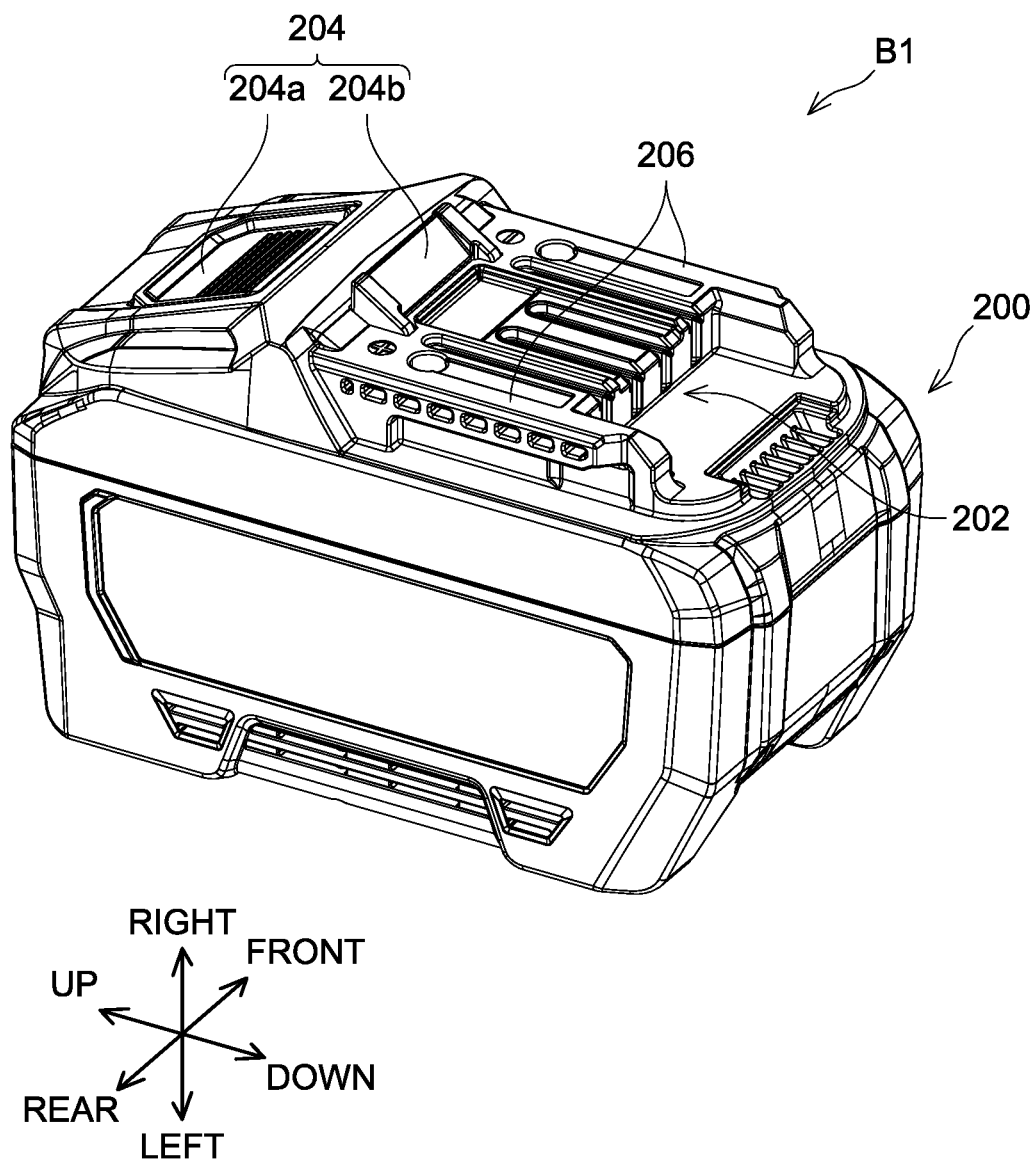
FIG. 10 illustrates a perspective view of a battery pack B1 of the embodiment.

Subsequently, with reference to FIG. 10, the battery pack B1 will be described. In FIG. 10, with a state of the battery pack B1 mounted in the battery interface 62 on the left surface of the terminal housing 60 as a reference (see FIG. 3), the front-rear direction, the left-right direction, and the up-down direction are defined. A rated voltage of the battery pack B1 is 36V, which is relatively high. As shown in FIG. 10, the battery pack B1 comprises a battery housing 200 configured to house a battery module (not shown) therein. The battery housing 200 is shaped as a substantially cuboid as a whole. The battery housing 200 comprises a terminal portion 202, a hook 204, and a pair of slide rails 206, The terminal portion 202 is provided with a battery-side terminal (not shown) configured to be electrically connected with the apparatus-side terminal 70 of the power cutter 10 when the battery pack B1 is mounted to the power cutter 10.

The hook 204 comprises an operation portion 204a and a projection portion 204b. The hook 204 is secured to the battery housing 200 movably in the left-right direction. The hook 204 is biased rightward by a compression spring (not shown and configured to move leftward in response to the operation portion 204a and/or the projection portion 204b being pressed leftward. When the battery pack B1 is mounted to the power cutter 10, the projection portion 204b is configured to engage with the terminal housing 60 of the power cutter 10 to secure the battery pack B1 to the power cutter 10. The battery pack B1 can be removed from the power cutter 10, by the user pressing the operation portion 204a leftward and sliding the battery pack B1 upward.

The slide rails 206 extend along the sliding direction (up-down direction in the present embodiment) and are disposed on both ends of the battery housing 200 in the front-rear direction. The slide rails 206 are configured to slidably engage with the slide grooves 68 of the power cutter 10 while the battery pack 131 is attached to or removed from the power cutter 10. A structure of the battery pack B2 is the same as that of the battery pack B1.

Figure 11:
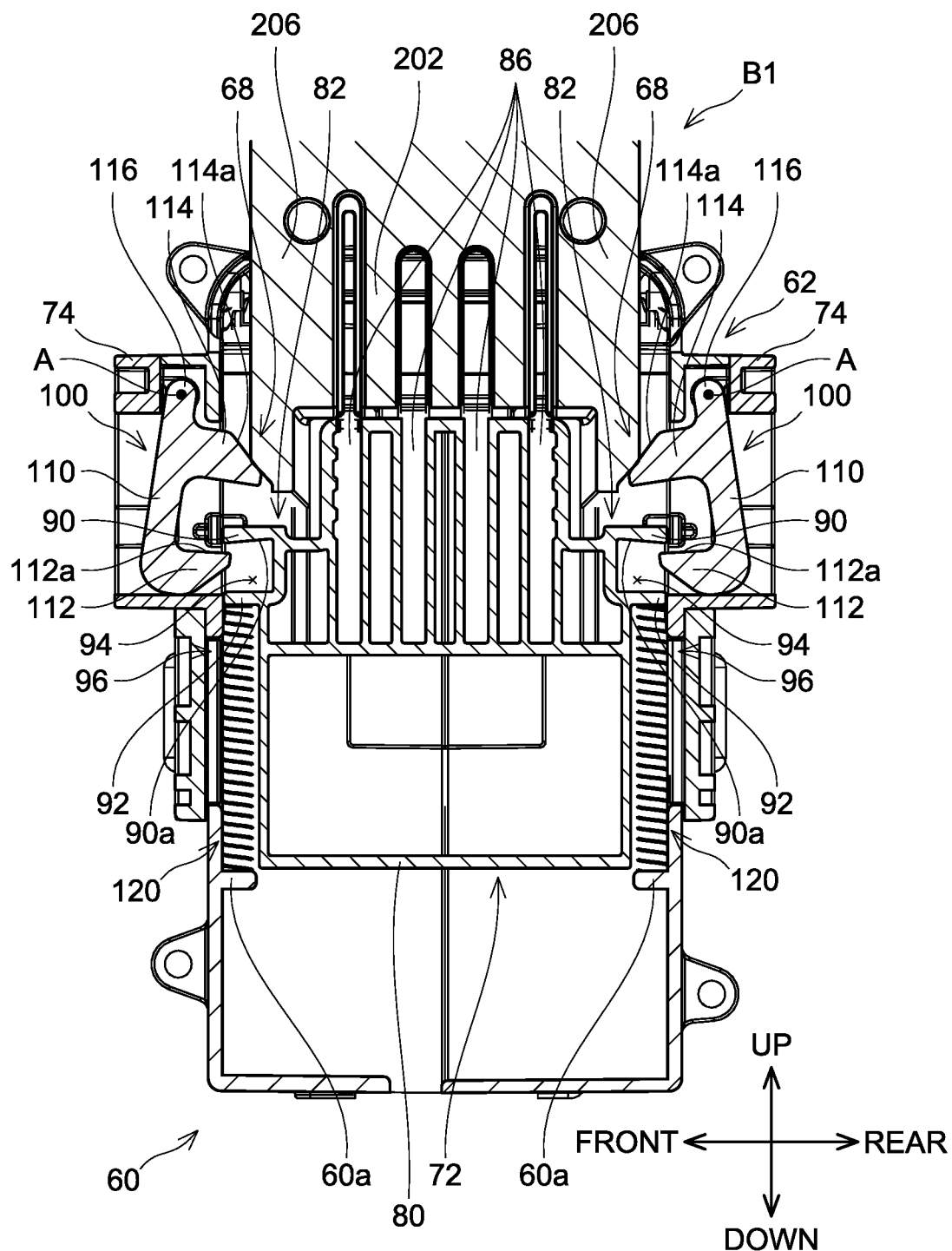
FIG. 11 illustrates a cross-sectional view (1) which shows operations of the terminal cover 72 and locking members 100 of the embodiment.
Figure 12:
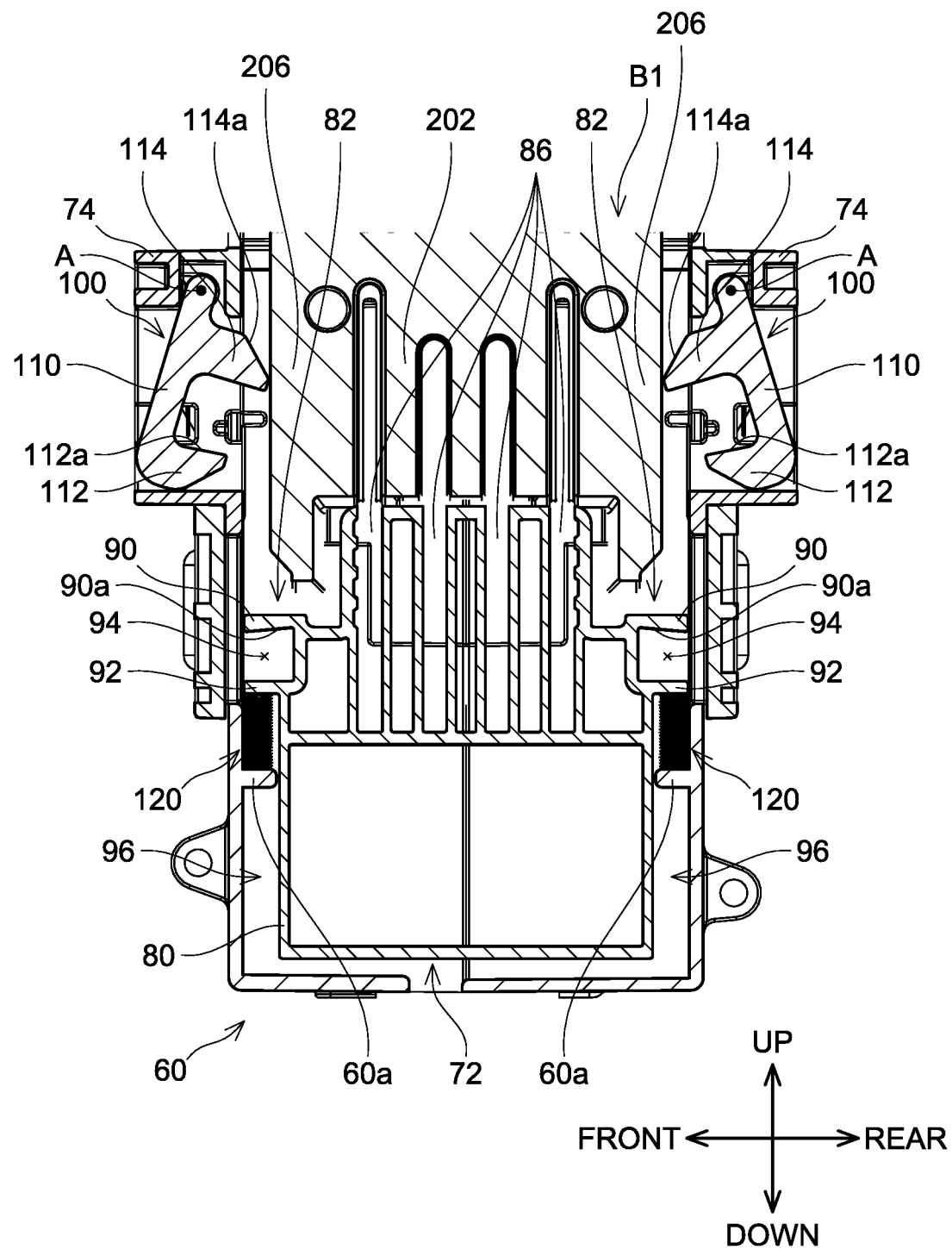
FIG. 12 illustrates a cross-sectional view (2) which shows the operations of the terminal cover 72 and the locking members 100 of the embodiment.

Subsequently, with reference to FIGS. 8, 11, and 12, processes of mounting the battery pack B1 to the battery interface 62 on the left surface of the terminal housing 60 of the power cutter 10 will be described. In FIGS. 11 and 12, for easier understanding, the apparatus-side terminal 70 is omitted.

In order to attach the battery pack Ell to the power cutter 10 in FIG. 8, the user inserts the slide rails 206 of the battery pack B1 (see FIG. 10) in the slide grooves 68 of the terminal housing 60 and moves the battery pack B1 downward relative to the power cutter 10. In this case, lower ends of the slide rails 206 of the battery pack 91 contact the inclined portions 114a of the hook portions 114 of the locking members 100, respectively. As shown in FIG. 11, when the user moves the battery pack B1 further downward, the locking members 100 are pivoted. Specifically, with the pivot axis A as its pivoting center, the locking member 100 on the front side pivots frontward. Similarly, with the pivot axis A as its pivoting center, the locking member 100 on the rear side pivots rearward. Due to this, the engaging portions 112 of the locking members 100 move outside of the first receptacles 94 of the terminal cover 72, i.e., to the unlock positions, respectively. Due to this, the engagement between the locking members 100 and the terminal cover 72 is released. Consequently, a lower end of the terminal portion 202 of the battery pack B1 contacts an upper wall of the body 80 of the terminal cover 72.

As shown in FIG. 12, when the user moves the battery pack B1 further downward, the battery pack B1 pushes the terminal cover 72 gradually downward. That is, the terminal cover 72 is moved from the covering position to the exposing position. Then, the apparatus-side terminal 70 (see FIG. 5) of the power cutter 10 and the battery-side terminal of the battery pack 91 are electrically connected with each other and also the battery pack B1 is secured to the power cutter 10.

Subsequently, with reference to FIGS. 8 and 12, processes of removing the battery pack B1 mounted to the battery interface 62 on the left surface of the terminal housing 60 of the power cutter 10 will be described. In a case of removing the battery pack B1 from the power cutter 10 of FIG. 12, the user presses the operation portion 204a (see FIG. 10) of the battery pack B1 inward. By way of this, the battery pack B1 is moved upward relative to the power cutter 10. Due to this, the battery pack B1 is removed from the power cutter 10. At this occasion, each of the locking members 100 is positioned at the unlock position, and the terminal cover 72 is positioned at the exposing position. When the battery pack B1 is removed from the power cutter 10, the terminal cover 72 is biased from the exposing position to the covering position by biasing force of the bias members 120 and also the lever springs connected with the locking members 100 cause the locking members 100 to pivot. Specifically, with the pivot axis A as its pivoting center, the locking member 100 on the front side pivots rearward. Similarly, with the pivot axis A as its pivoting center, the locking member 100 on the rear side pivots frontward. When the terminal cover 72 is biased from the exposing position to the covering position, upper surfaces of the second extensions 90 of the terminal cover 72 contact lower surfaces of the engaging portions 112 of the locking members 100 and the locking members 100 are caused to pivot. Specifically, with the pivot axis A as its pivoting center, the locking member 100 on the front side pivots frontward. Similarly, with the pivot axis A as its pivoting center, the locking member 100 on the rear side pivots rearward. After that, once the second extensions 90 have been moved higher than the engaging portions 112, the lever springs connected with the locking members 100 cause the locking members 100 to pivot, respectively. Specifically, with the pivot axis A as its pivoting center, the locking member 100 on the front side pivots rearward. Similarly, with the pivot axis A as its pivoting center, the locking member 100 on the rear side pivots frontward. Due to this, the terminal cover 72 is moved from the exposing position to the covering position, the locking members 100 are moved from the unlock positions to the lock positions. With the same processes as those for the battery pack B1, the battery pack B2 can also be attached to or removed from the battery interface on the right side of the terminal housing 60 of the power cutter 10.

Given the above, as shown in FIGS. 3 to 13, the power cutter 10 according to one embodiment comprises die terminal housing 60 (example of "housing"), the apparatus-side terminal 70 (example of "first electrical apparatus-side terminal"), the terminal cover 72, and the locking members 100 (example of "first locking member"). Each of the locking members 100 is configured to move from the lock position to the unlock position while the battery pack B1 is slid in the sliding direction to be attached to the terminal housing 60. When each of the locking members 100 is positioned at the lock position, the user is unable to directly shift that locking member 100 from the lock position to the unlock position (In other words, when each locking member 100 is positioned at the lock position, that locking member 100 is positioned at a position which disables the locking member 100 from being directly shifted from the lock position to the unlock position by the user). According to the above configuration, each of the locking members 100 can be prevented from being moved from the lock position to the unlock position by the user in the state where the battery pack B1 is not attached to the power cutter 10. This reduces the possibility that the terminal cover 72 may be moved from the covering position to the exposing position by which the apparatus-side-terminal 70 becomes exposed in the state where the battery pack B1 is not attached to the power cutter 10. Accordingly, safety for the user who uses the power cutter 10 can be improved.

The power cutter 10 according to one aspect may comprise two locking members 100 as shown in FIGS. 8 and 9. In a state where at least one of the two locking members 100 is engaged with the terminal cover 72, the movement of the terminal cover 72 from the covering position to the exposing position is restricted. According to the above configuration, even when the locking member 100 on the front side is moved from the lock position to the unlock position for example, the movement of the terminal cover 72 from the covering position to the exposing position can be restricted as long as the locking member 100 on the rear side is positioned at the lock position. Due to this, even if a small-sized finger of a user touches the front side locking member 100 and that locking member 100 moves from the lock position to the unlock position, the terminal cover 72 can be prevented from moving from the covering position to the exposing position.

Accordingly, safety for the user who uses the power cutter 10 can further be improved.

The terminal housing 60 of the power cutter 10 according to one aspect comprises pair of slide grooves 68 (example of "pair of recessed grooves") extending along the sliding direction, as shown in FIGS. 8 and 9. The two locking members 100 are disposed in the respective slide grooves 68 in the pair. The width L1 of each slide groove 68 in a groove direction is smaller than the size L2 of the tip 300a of the object 300, which is a model of a user's finger. The above configuration can reduce a possibility of the two locking members 100 being manipulated simultaneously. Accordingly, the safety for the user who uses the power cutter 10 can further be improved.

The terminal housing 60 of the power cutter 10 according to one aspect comprises the slide grooves 68 (example of "recessed grooves") extending along the sliding direction, as shown in FIGS. 8 and 9. The locking members 100 are disposed in the slide grooves 68. The locking members 100 are configured to be moved from the lock position to the unlock position by the slide rails 206 of the battery pack B1 that are inserted in the slide grooves 68. The width L1 of each slide groove 68 in the groove direction is smaller than the size L2 of the tip 300a of the object 300, which is a model of a user's finger. If the locking members 100 are not configured to be moved from the lock position to the unlock position by the slide rails 206 of the battery pack B1, another member different from the locking members 100 needs to be provided. Specifically, such member configured to move the locking members 100 from the lock position to the unlock position in response to being touched by the slide rails 206 of the battery pack B1 would be necessary. According to the above configuration, another member different from the locking members 100 is not necessary. Accordingly, a number of components of the power cutter 10 can be minimized.

The power cutter 10 according to one aspect comprises the battery interface 62 on the left side to which the battery pack B1 is configured tip be detachably attached and the battery interface on the right side to which the battery pack B2 is configured to be detachably attached. In the power cutter 10, it is likely that electric power supply for the power cutter 10 is served by the battery pack 131 when the battery pack B1 is attached to the battery interface 62 on the left side of the terminal housing 60 of the power cutter 10 while the battery pack B2 is not attached to the power cutter 10. In such state, it is not desirable that the apparatus-side terminal on the right side of the terminal housing 60 of the power cutter 10 is exposed. According to the above configuration, the right side apparatus-side terminal can be prevented from being exposed in the state where the battery pack B1 is attached to the power cutter 10 and the battery pack B2 is not attached to the power cutter 10. Accordingly, safety for the user who uses the power cutter 10 can be improved.

(First Variant)

Figure 14:
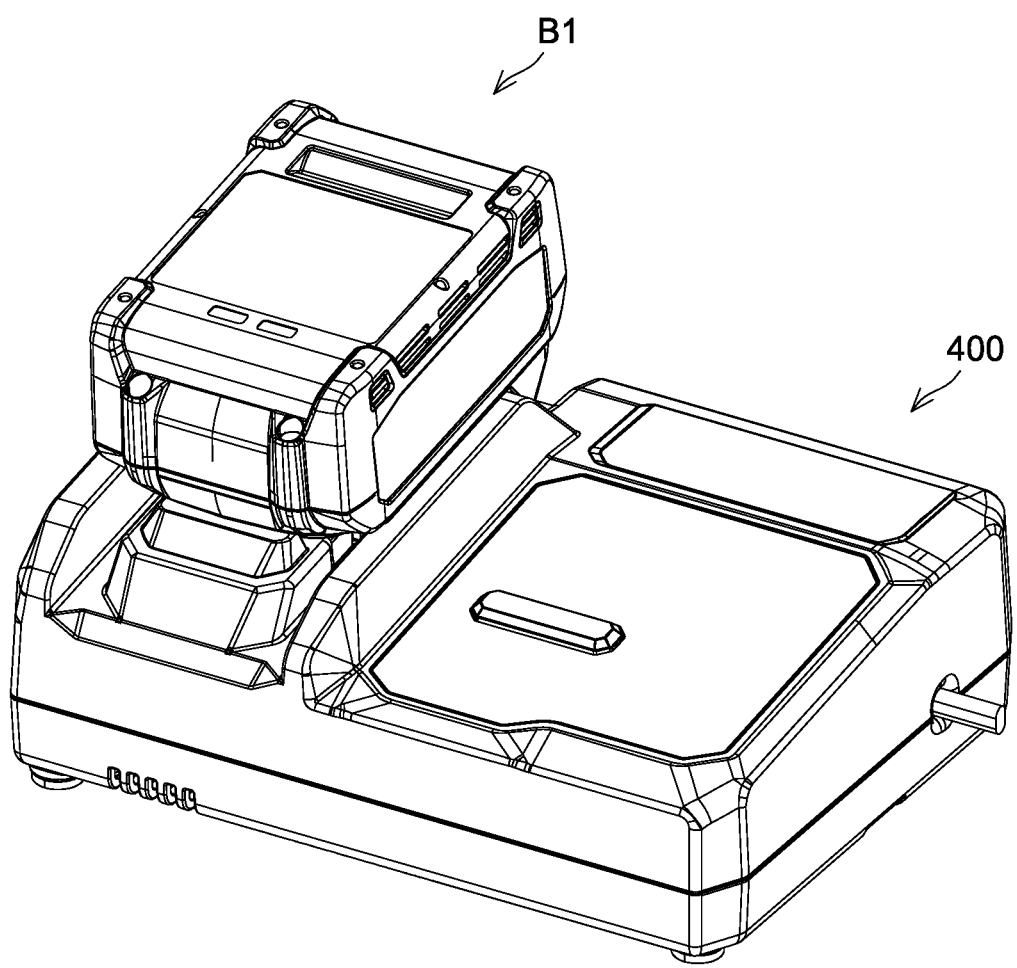
FIG. 14 illustrates a perspective view of a charger 400 and a battery pack B1 of a variant.

The "electrical apparatus" is not limited to the power cutter 10, but may be an apparatus configured to be operated by power supplied from battery pack(s), such as a cutter, a trimmer, a chainsaw, a dust collector, a circular saw, and a carrying vehicle, for example. Further, a charger 400 in FIG. 14 may be "electrical apparatus". Specifically, the charger 400 simply needs to comprise features which respectively correspond to the terminal cover 72, the locking members 100, and the bias members 120 of the power cutter 10 in the embodiment. In another variant, a battery pack may comprise features which respectively correspond to the terminal cover 72, the locking members 100, and the bias members 120 of the power cutter 10 in the embodiment. In other words, the battery pack may be an example of the "electrical apparatus".

(Second Variant)

The power cutter 10 may comprise one locking member 100, or may comprise three or more locking members 100.

(Third Variant)

Restriction on the movement of the terminal cover 72 from the covering position to the exposing position may be released in a case where the engagement between the terminal cover 72 and one of the two locking members 100 is released.

(Fourth Variant)

The power cutter 10 may not comprise the bias member(s) 120. In the present variant, the locking member(s) 100 may be configured to allow the user to move the locking member (s) 100 from the unlock position to the lock position.

(Fifth Variant)

The locking members 100 may not be connected with the lever springs (not shown) each of which would bias the corresponding locking member 100 from the unlock position to the lock position. In the present variant, the terminal cover 72 may comprise moving portion(s) each of which contacts the lower surface of the hook portion 114 of the corresponding locking member 100 when the terminal cover 72 moves from the exposing position (see FIG. 9) to the covering position (see FIG. 8). Further, in the present variant, each of the shaft portion(s) 116 may be disposed at or near a center of the corresponding base portion 110 in the up-down direction. That is, the pivot axis A may be disposed at or near the center of the base portion 110 in the up-down direction. According to such configuration, when the battery pack B1 is removed from the power cutter 10, the terminal cover 72 is biased from the exposing position to the covering position by the bias member(s) 120. Then, when the terminal cover 72 moves from the exposing position to the covering position, the locking member(s) 100 are moved from the unlock position to the lock position by the moving portion(s) of the terminal cover 72. Due to this, the user may not have to move the locking member(s) 100 from the unlock position to the lock position. Thus, convenience for the user can be improved.

Reference Example

For example, if the power cutter 10 comprises two locking members 100, and also the two locking members 100 are located at positions which disable the two locking members 100 from being operated simultaneously (all at once), each of the two locking members 100 may be located at a position which enables that locking member 100 to be shifted from the lock position to the unlock position with the object 300 (e.g., a user's finger). For example, the two locking member(s) 100 simply need to be located at positions which disable the two locking members 100 from being operated simultaneously by one of the hands of the user.

What is claimed is:

1. An electrical apparatus comprising:
   a housing comprising a first receptacle to which a first target apparatus is configured to be detachably attached by sliding the first target apparatus in a sliding direction;
   a first electrical apparatus-side terminal configured to be electrically connected with a first target apparatus-side terminal of the first target apparatus attached to the first receptacle;
   a first terminal cover configured to move between a covering position at which the first terminal cover covers the first electrical apparatus-side terminal and an exposing position at which the first terminal cover leaves the first electrical apparatus-side terminal exposed; and
   a first locking member configured to engage with the first terminal cover positioned at the covering position, and configured to move between a lock position at which the first locking member restricts movement of the first terminal cover from the covering position to the exposing position and an unlock position at which the first locking member does not restrict the movement of the first terminal cover from the covering position to the exposing position,
   wherein the first locking member is configured to move from the lock position to the unlock position while the first target apparatus is slid in the sliding direction to be attached to the housing, and
   when the first locking member is positioned at the lock position, a user is unable to directly shift the first locking member from the lock position to the unlock position.

2. The electrical apparatus according to claim 1, wherein the first locking member comprises two first locking members, and
   under a state in which at least one of the two first locking members engages with the first terminal cover, the movement of the first terminal cover from the covering position to the exposing position is restricted.

3. The electrical apparatus according to claim 2, wherein the housing comprises a pair of recessed grooves extending along the sliding direction, each of the two first locking members is disposed in a corresponding one of the recessed grooves, and a size of each of the recessed grooves in a width direction is smaller than a size of a user's finger.

4. The electrical apparatus according to claim 1, wherein the housing comprises a recessed groove extending along the sliding direction, the first locking member is disposed in the recessed groove, the first locking member is configured to move from the lock position to the unlock position by a slide rail of the first target apparatus being inserted into the recessed groove, and a size of the recessed groove in a width direction is smaller than a size of a user's finger.

5. The electrical apparatus according to claim 1, further comprising:

a bias member configured to bias the first terminal cover from the exposing position to the covering position, wherein the first terminal cover further comprises a mover part configured to contact the first locking member to move the first locking member from the unlock position to the lock position when the first terminal cover is biased from the exposing position to the covering position by the bias member.

6. The electrical apparatus according to claim 1, wherein the first target apparatus is a first battery pack, wherein the housing further comprises a second receptacle to which a second battery pack is configured to be detachably attached by sliding the second battery pack in the sliding direction, wherein the electrical apparatus is a working machine configured to operate with electric power supplied from the first battery pack and the second battery pack, wherein the working machine further comprises:

a second electrical apparatus-side terminal configured to be electrically connected with a second target apparatus-side terminal of the second battery pack attached to the second receptacle;

a second terminal cover configured to move between a covering position at which the second terminal cover covers the second electrical apparatus-side terminal and an exposing position at which the second terminal cover leaves the second electrical apparatus-side terminal exposed; and a second locking member configured to engage with the second terminal cover positioned at the covering position, and configured to move between a lock position at which the second locking member restricts movement of the second terminal cover from the covering position to the exposing position and an unlock position at which the second locking member does not restrict the movement of the second terminal cover from the covering position to the exposing position, wherein when the second battery pack is slid in the sliding direction to be attached to the housing, the second locking member is configured to move from the lock position to the unlock position, and when the second locking member is positioned at the lock position, the user is unable to directly shift the second locking member from the lock position to the unlock position.

7. An electrical apparatus comprising:

a housing comprising a first receptacle to which a first target apparatus is configured to be detachably attached by sliding the first target apparatus in a sliding direction;

a first electrical apparatus-side terminal configured to be electrically connected with a first target apparatus side terminal of the first target apparatus attached to the first receptacle;

a first terminal cover configured to move between a covering position at which the first terminal cover covers the first electrical apparatus-side terminal and an exposing position at which the first terminal cover leaves the first electrical apparatus-side terminal is exposed; and a first locking member configured to engage with the first terminal cover positioned at the covering position, and configured to move between a lock position at which the fist locking member restricts movement of the first terminal cover from the covering position to the exposing position and an unlock position at which the first locking member does not restrict the movement of the first terminal cover from the covering position to the exposing position, wherein the first locking member is configured to move from the lock position to the unlock position while the first target apparatus is slid in the sliding direction to be attached to the housing, when the first locking member is positioned at the lock position, a user is unable to directly shift the first locking member from the lock position to the unlock position, wherein the first locking member comprises two first locking members, under a state where at least one of the two first locking members engages with the first terminal cover, the movement of the first terminal cover from the covering position to the exposing position is restricted, the housing comprises a pair of recessed grooves extending along the sliding direction, each of the two first locking members is disposed in a corresponding one of the pair of the recessed grooves, a size of each of the recessed grooves in a width direction is smaller than a size of a users finger, each of the two first locking members is configured to move from the lock position to the unlock position by slide rails which the first target apparatus has being inserted into the recessed grooves, wherein the electrical apparatus further comprises:

a bias member configured to bias the first terminal cover from the exposing position to the covering position, wherein the first terminal cover further comprises a mover part configured to contact the two first locking members to move the two first locking members from the unlock position to the lock position when the first terminal cover is biased from the exposing position to the covering position by the bias member, wherein the first target apparatus is a first battery pack, wherein the housing further comprises a second receptacle to which a second battery pack is configured to be detachably attached by sliding the second battery pack in the sliding direction, wherein the electrical apparatus is a working machine configured to operate with electric power supplied from the first battery pack and the second battery pack, wherein the working machine further comprises:
- a second electrical apparatus-side terminal configured to be electrically connected with a second target apparatus-side terminal of the second battery pack attached to the second receptacle;
- a second terminal cover configured to move between a covering position at which the second terminal cover covers the second electrical apparatus-side terminal and an exposing position at which the second terminal cover leaves the second electrical apparatus-side terminal exposed; and
- a second locking member configured to engage with the second terminal cover positioned at the covering position, and configured to move between a lock position at which the second locking member restricts movement of the second terminal cover from the covering position to the exposing position and an unlock position at which the second locking member does not make the movement of the second terminal cover from the covering position to the exposing position restricted, wherein the second locking member is configured to move from the lock position to the unlock position while the second battery pack is slid in the sliding direction to be attached to the housing, and when the second locking member is positioned at the lock position, the user is unable to directly shift the second locking member from the lock position to the unlock position.

* * * * *